United States Patent
Weng et al.

(10) Patent No.: US 10,437,068 B2
(45) Date of Patent: Oct. 8, 2019

(54) OPTICAL WAVEGUIDE ELEMENT AND DISPLAY DEVICE

(71) Applicant: Coretronic Corporation, Hsin-Chu (TW)

(72) Inventors: Yi-Hsuang Weng, Hsin-Chu (TW); Chih-Hsien Tsai, Hsin-Chu (TW); Chi-Tang Hsieh, Hsin-Chu (TW); Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/894,854

(22) Filed: Feb. 12, 2018

(65) Prior Publication Data
US 2018/0231783 A1    Aug. 16, 2018

(30) Foreign Application Priority Data
Feb. 16, 2017 (CN) .......................... 2017 1 0083128

(51) Int. Cl.
*G02B 27/01* (2006.01)
*F21V 8/00* (2006.01)

(52) U.S. Cl.
CPC ......... *G02B 27/0172* (2013.01); *G02B 6/005* (2013.01); *G02B 6/0015* (2013.01); *G02B 6/0076* (2013.01); *G02B 2027/0118* (2013.01)

(58) Field of Classification Search
None
See application file for complete search history.

(56) References Cited

U.S. PATENT DOCUMENTS

| 5,076,664 A | 12/1991 | Migozzi |
| 5,821,911 A * | 10/1998 | Jachimowicz ....... G02B 27/026 345/7 |

(Continued)

FOREIGN PATENT DOCUMENTS

| CN | 103513423 | 1/2014 |
| CN | 203673146 | 6/2014 |

(Continued)

OTHER PUBLICATIONS

Mirza et al., "Key challenges to affordable see-through wearable displays: the missing link for mobile AR mass deployment," SPIE Proceedings, vol. 8720, May 31, 2013, pp. 1-6.

(Continued)

*Primary Examiner* — Tina M Wong
(74) *Attorney, Agent, or Firm* — JCIPRNET

(57) ABSTRACT

An optical waveguide element including a light entrance portion and a light exit portion is provided. The light entrance portion includes a first light guide layer, a second light guide layer, and at least one third light guide layer. Light entrance surfaces of the first light guide layer and the second light guide layer jointly compose a first inclined surface. Light exit surfaces of the first light guide layer and the second light guide layer jointly compose a second inclined surface. The first inclined surface and the second inclined surface are inclined relative to a bottom surface of the first light guide layer. The thickness of the light exit portion is less than the total thickness of the first light guide layer, the second light guide layer, and the at least one third light guide layer. A display device is also provided.

10 Claims, 3 Drawing Sheets

(56) References Cited

U.S. PATENT DOCUMENTS

| | | | |
|---|---|---|---|
| 6,356,675 B1* | 3/2002 | Weiss | G01N 21/431 250/227.14 |
| 7,457,040 B2 | 11/2008 | Amitai | |
| 7,577,326 B2 | 8/2009 | Amitai | |
| 7,710,655 B2* | 5/2010 | Freeman | G02B 5/1814 359/15 |
| 8,220,966 B2* | 7/2012 | Mukawa | G02B 3/0056 359/15 |
| 8,472,119 B1* | 6/2013 | Kelly | G02B 5/30 345/8 |
| 8,643,948 B2 | 2/2014 | Amitai et al. | |
| 8,743,464 B1 | 6/2014 | Amirparviz | |
| 9,158,113 B2* | 10/2015 | Amirparviz | G02B 27/0093 |
| 9,223,139 B2 | 12/2015 | Kress et al. | |
| 9,915,823 B1* | 3/2018 | Kress | G02B 27/0172 |
| 10,025,033 B2* | 7/2018 | Wang | G02B 6/262 |
| 2006/0127003 A1* | 6/2006 | Park | G02B 6/241 385/31 |
| 2008/0151379 A1 | 6/2008 | Amitai | |
| 2010/0157400 A1 | 6/2010 | Dimov et al. | |
| 2010/0201953 A1* | 8/2010 | Freeman | G02B 5/1814 353/20 |
| 2010/0226656 A1* | 9/2010 | Niitsu | G02B 6/4214 398/139 |
| 2011/0187293 A1* | 8/2011 | Travis | G02B 6/002 315/313 |
| 2012/0207432 A1* | 8/2012 | Travis | G02B 6/0028 385/31 |
| 2013/0250430 A1 | 9/2013 | Robbins et al. | |
| 2013/0322810 A1* | 12/2013 | Robbins | G02B 5/30 385/11 |
| 2014/0092482 A1 | 4/2014 | Dubroca et al. | |
| 2014/0225813 A1 | 8/2014 | Komatsu et al. | |
| 2015/0138451 A1 | 5/2015 | Amitai | |
| 2015/0153569 A1 | 6/2015 | Yonekubo | |
| 2015/0226971 A1* | 8/2015 | Kim | G02B 27/0172 359/633 |
| 2015/0338656 A1 | 11/2015 | Tsuruyama et al. | |
| 2016/0116664 A1 | 4/2016 | Wheatley et al. | |
| 2016/0124232 A1 | 5/2016 | Ide et al. | |
| 2017/0285346 A1* | 10/2017 | Pan | G02B 6/0035 |
| 2018/0059306 A1 | 3/2018 | Pan et al. | |
| 2018/0231783 A1* | 8/2018 | Weng | G02B 27/0172 |

FOREIGN PATENT DOCUMENTS

| | | |
|---|---|---|
| CN | 104204905 | 12/2014 |
| CN | 104216042 | 12/2014 |
| CN | 104503087 | 4/2015 |
| CN | 104656258 | 5/2015 |
| TW | 201428345 | 7/2014 |
| TW | 201502578 | 1/2015 |
| TW | M512138 | 11/2015 |
| WO | 2015148087 | 10/2015 |

OTHER PUBLICATIONS

Watanabe et al., "A Head Mounted Display Using the Original Flexible Arm and Headband," The 22nd International Display Workshops, Dec. 9-11, 2015, pp. 1116-1119.

* cited by examiner

OPTICAL WAVEGUIDE ELEMENT AND DISPLAY DEVICE

CROSS-REFERENCE TO RELATED APPLICATION

This application claims the priority benefit of China application serial no. 201710083128.2, filed on Feb. 16, 2017. The entirety of the above-mentioned patent application is hereby incorporated by reference herein and made a part of this specification.

BACKGROUND OF THE INVENTION

1. Field of the Invention

The invention relates to an optical waveguide element and a display device with the optical waveguide element.

2. Description of Related Art

Currently, head-mounted displays (HMD) are one of the most promising products. Related applications are divided into an augmented reality (AR) technique and a virtual reality (VR) technique currently. Compared with the virtual reality technique producing a fully virtual environment, augmented reality enables a user to see an outside environmental image and displayed information at the same time, and thereby the display effect of augmented reality is achieved.

Among basic optical architectures for implementing augmented reality, beam splitter array waveguide which takes wide viewing angle, full-color image, light weight and thin volume into account has become one of the main choices of various display devices of augmented reality at present. However, in a display device with such an architecture, a display beam which enters an optical waveguide element cannot effectively fill the sectional area of these beam splitters in the optical waveguide element, causing a phenomenon that the brightness of an outputted displayed image is non-uniform.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in this "BACKGROUND OF THE INVENTION" section does not mean that one or more problems to be resolved by one or more embodiments of the invention was acknowledged by a person of ordinary skill in the art.

SUMMARY OF THE INVENTION

The invention provides an optical waveguide element to help display beams leaving the optical waveguide element to be distributed uniformly in the space.

The invention provides a display device applying the above-mentioned optical waveguide element has good display quality.

Other objects and advantages of the invention can be further illustrated by the technical features broadly embodied and described as follows.

In order to achieve one or a portion of or all of the objects or other objects, an embodiment of the invention provides an optical waveguide element is adapted to receive a display beam. The optical waveguide element includes a light entrance portion and a light exit portion. The light entrance portion includes a first light guide layer, a second light guide layer, and at least one third light guide layer. The second light guide layer is connected to the first light guide layer. The at least one third light guide layer is connected to the first light guide layer or the second light guide layer. Light entrance surfaces of the first light guide layer and the second light guide layer jointly compose a first inclined surface, and light exit surfaces of the first light guide layer and the second light guide layer jointly compose a second inclined surface. The first inclined surface and the second inclined surface are respectively connected to and inclined relative to a bottom surface of the first light guide layer. The light exit portion is connected to the second inclined surface, and the thickness of the light exit portion is less than the total thickness of the first light guide layer, the second light guide layer, and the at least one third light guide layer. The display beam enters the optical waveguide element via the light entrance portion, and is transmitted to a display area via the light exit portion.

In order to achieve one or a portion of or all of the objects or other objects, an embodiment of the invention provides a display device including the above-mentioned optical waveguide element and a display light source. The display light source is disposed beside the first inclined surface. The display light source is adapted to emit a display beam.

Based on the foregoing, the embodiments of the invention have at least one of the following advantages or effects. In the optical waveguide element of the embodiment of the invention, since the display beam is split continuously while passing through the first light guide layer, the second light guide layer, and the third light guide layer, the sectional area of the display beam is enlarged, and therefore the optical waveguide element may improve the known phenomenon of non-uniform brightness which is caused when a display beam cannot effectively fill the sectional area of beam splitters in an optical waveguide element, so that the display beams which leave the optical waveguide element may be distributed uniformly in the space. In addition, the display device applying the above-mentioned optical waveguide element may have good display quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
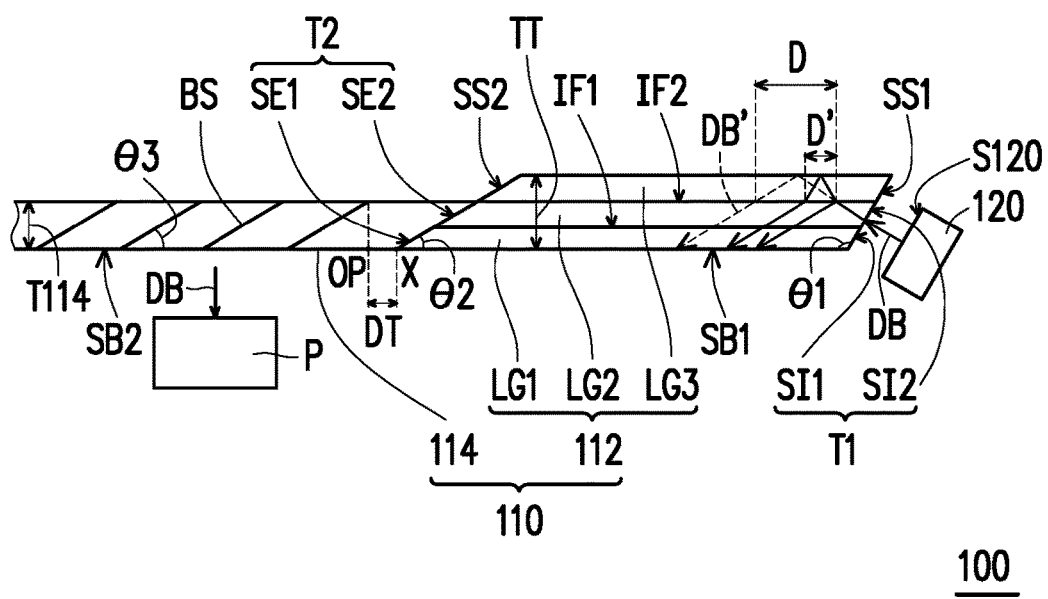
FIG. 1 is a partial schematic cross-sectional view of a display device according to a first embodiment of the invention.

FIG. 1 is a partial schematic cross-sectional view of a display device according to a first embodiment of the invention. Please refer to FIG. 1, a display device 100 of the embodiment is, for example, a head-mounted display, which may be fixed on the head of a user by utilizing corresponding mechanical components and shell (not shown) so as to transmit a display beam to the eyes of the user.

The display device 100 includes an optical waveguide element 110 and a display light source 120. The optical waveguide element 110 includes a light entrance portion 112 and a light exit portion 114. The light entrance portion 112 includes a first light guide layer LG1, a second light guide layer LG2, and at least one third light guide layer LG3. FIG. 1 schematically shows one third light guide layer LG3, but there may be one or more third light guide layers LG3.

The second light guide layer LG2 is connected to the first light guide layer LG1, and the third light guide layer LG3 is connected to the first light guide layer LG1 or the second light guide layer LG2. For example, the third light guide layer LG3 may be connected to the second light guide layer LG2, so that the second light guide layer LG2 is located between the third light guide layer LG3 and the first light guide layer LG1, but the invention is not limited thereto. In another embodiment, the third light guide layer LG3 may be connected to the first light guide layer LG1, so that the first light guide layer LG1 is located between the third light guide layer LG3 and the second light guide layer LG2. Alternatively, if there is more than one third light guide layer LG3, for example, if there are two third light guide layers LG3, the third light guide layers LG3 may be connected respectively to the first light guide layer LG1 and the second light guide layer LG2, so that the first light guide layer LG1 and the second light guide layer LG2 are located between the two third light guide layers LG3, and the above-mentioned content will be described in detail in the following description.

The first light guide layer LG1, the second light guide layer LG2 and the third light guide layer LG3 are arranged in parallel, wherein a first interface IF1 is between the first light guide layer LG1 and the second light guide layer LG2, and a second interface IF2 is between the third light guide layer LG3 and the second light guide layer LG2 connected thereto. The first interface IF1 is parallel to the second interface IF2. At least one film layer may be formed respectively at the first interface IF1 and the second interface IF2 according to requirement. For example, an adhesive layer (not shown) or a partial transmitting and partial reflecting layer (not shown) may be formed at at least one of the first interface TF1 and the second interface TF2.

A light entrance surface SI1 of the first light guide layer LG1 and a light entrance surface SI2 of the second light guide layer LG2 jointly compose a first inclined surface T1. A light exit surface SE1 of the first light guide layer LG1 and a light exit surface SE2 of the second light guide layer LG2 jointly compose a second inclined surface T2. The first inclined surface T1 and the second inclined surface T2 are respectively connected to and inclined relative to a bottom surface SB1 of the first light guide layer LG1. That is, an angle θ1 between the first inclined surface T1 and the bottom surface SB1 is not equal to 90 degrees, and an angle θ2 between the second inclined surface T2 and the bottom surface SB1 is not equal to 90 degrees. For example, the angle θ1 and the angle θ2 may meet: (180°−θ1)/2=θ2, so that errors which are produced in alignment between components during the assembly of the display device 100 may be reduced, but the invention is not limited thereto. A first sidewall surface SS1 of the third light guide layer LG3 and the first inclined surface T1 may be coplanar, and a second sidewall surface SS2 of the third light guide layer LG3 and the second inclined surface T2 may be coplanar, so that manufacturing difficulty may be decreased, but the invention is not limited thereto. In another embodiment, the first sidewall surface SS1 of the third light guide layer LG3 and the first inclined surface T1 may not be coplanar. For example, the first sidewall surface SS1 of the third light guide layer LG3 may be indented from the first inclined surface T1 for a certain distance, but the invention is not limited thereto. In addition, the second sidewall surface SS2 of the third light guide layer LG3 and the second inclined surface T2 may also not be coplanar. For example, the second sidewall surface SS2 may be indented from the second inclined surface T2 for a certain distance, but the invention is not limited thereto.

The light exit portion 114 of the optical waveguide element 110 is connected to the second inclined surface T2. For example, the light exit portion 114 may be jointed with the second inclined surface T2 through a fixing mechanical component or an adhesive layer (such as optical adhesive), but the invention is not limited thereto. The thickness T114 of the light exit portion 114 is less than the total thickness TT of the first light guide layer LG1, the second light guide layer LG2, and the at least one third light guide layer LG3. For example, the thickness T114 of the light exit portion 114 may be equal to the total thickness of the first light guide layer LG1 and the second light guide layer LG2, but the invention is not limited thereto.

A plurality of beam splitters BS are located in the light exit portion 114 of the optical waveguide element 110. The beam splitters BS are parallel to each other and are arranged at intervals. Specifically, the beam splitters BS are inclined relative to a bottom surface SB2 of the light exit portion 114. That is, an angle θ3 between the beam splitters BS and the bottom surface SB2 is not equal to 90 degrees and the angle θ3 is less than 90 degrees. In addition, inclination directions of the beam splitters BS and the second inclined surface T2 are the same. The angle θ3 may be equal to the angle θ2, but the invention is not limited thereto. It is noted that the distribution and arrangement interval of the beam splitters BS may be changed according to requirement, and are not limited to those shown in FIG. 1.

The display light source 120 is disposed beside the first inclined surface T1, and the display light source 120 is adapted to emit a display beam DB. For example, the display light source 120 may be a liquid crystal display (LCD), a plasma display, an organic light-emitting diode (OLED) display, an electro-wetting display (EWD), an electro-phoretic display (EPD), an electro-chromic display (ECD), a digital micromirror device (DMD) or other applicable display light sources. In addition, optical elements, such as one or more lenses, may be configured/disposed between the display light source 120 and the first inclined surface T1, to gather or uniformly transmit the display beam DB to the optical waveguide element 110, but the invention is not limited thereto. The optical waveguide element 110 is adapted to receive the display beam DB, and the display beam DB enters the optical waveguide element 110 via the light entrance portion 112, and is transmitted to a display area P or a light-receiving area (such as a pupil shown in FIG. 1, but the invention is not limited thereto) via the light exit portion 114.

By controlling the angle of the display beam DB entering the first inclined surface T1, the angle of the display beam DB exiting the optical waveguide element 110 is adjusted. For example, a light exit surface S120 of the display light source 120 may be arranged parallel to the first inclined surface T1, so that most of the display beam DB enter the first inclined surface T1 in a normal incidence manner. Thus, most of the display beam DB may exit the optical waveguide element 110 in a normal incidence manner. For example, the light exit surface S120 of the display light source 120 is arranged parallel to the first inclined surface T1, so that most of the display beam DB enters the light entrance portion 112 of the optical waveguide element 110 by an angle (the angle between the first inclined surface T1 and the display beam DB is approximately 90 degrees) perpendicular to the first inclined surface T1, and thus, most of the display beam DB may leave the optical waveguide element 110 in a direction perpendicular to the bottom surface SB2 of the light exit portion 114 of the optical waveguide element 110 (the angle between the display beam DB and the bottom surface SB2 of the light exit portion 114 is approximately 90 degrees).

In addition, since the first light guide layer LG1, the second light guide layer LG2 and the third light guide layer LG3 are a light-transmitting material (such as glass, acryl or other suitable materials) and refractive indices of the first light guide layer LG1, the second light guide layer LG2 and the third light guide layer LG3 are higher than the refractive index of the air, under the condition of meeting total internal reflection (TIR), the display beam DB which enters the light entrance portion 112 may be transmitted toward the light exit portion 114 by the way of total internal reflection, and may enter the light exit portion 114 from the area, which is connected to the second inclined surface T2, of the light exit portion 114. Likewise, since the light exit portion 114 is a light-transmitting material (such as glass, acryl or other suitable materials) and the refractive index of the light exit portion 114 is greater than the refractive index of the air, under the condition of meeting total internal reflection, the display beam DB which enters the light exit portion 114 may continue to be transmitted forward (transmitted in a direction away from the display light source 120) by the way of total internal reflection, wherein a portion of the display beam DB which is transmitted to the beam splitters BS will be reflected to the display area P by the beam splitters BS, while the other portion of the display beam DB will pass through the beam splitters BS and continue to be transmitted forward. In one embodiment, the reflectivity of the beam splitters BS may be increased gradually in a direction away from the second inclined surface T2, and the transmittance of the beam splitters BS may be decreased gradually in the direction away from the second inclined surface T2, so that the light intensities of the display beams DB exiting the optical waveguide element 110 from the different beam splitters BS are distributed uniformly.

In the multi-layered design of the light entrance portion 112, a portion of the display beam DB will be reflected by the first interface IF1 (or the second interface IF2) each time when the display beam DB is transmitted to the first interface IF1 (or the second interface IF2), and the other portion of the display beam DB will pass through the first interface IF1 (or the second interface IF2). By utilizing the continuous splitting of the display beams DB (reflected by the interfaces or passing through the interfaces) by the first interface IF1 and the second interface IF2, dark areas (i.e. blank areas among the display beams DB) in the light entrance portion 112 may be reduced, that is, the sectional area of the display beams DB is enlarged, consequently, when the display beams DB are transmitted to the light exit portion 114, the sectional area of the beam splitters BS may be effectively filled up, and the production of dark areas in the light exit portion 114 is prevented. In other words, by utilizing the multi-layered design of the light entrance portion 112, the display beams DB may be distributed uniformly in the light entrance portion 112 of the optical waveguide element 110. Therefore, the optical waveguide element 110 may improve the known phenomenon of nonuniform brightness, so that the display beams DB which exit the optical waveguide element 110 may be distributed uniformly in the space. In addition, the multi-layered design of the light entrance portion 112 also has advantages such as easiness in manufacturing and high yield.

In one embodiment, the materials of the first light guide layer LG1, the second light guide layer LG2, the third light guide layer LG3 and the light exit portion 114 may be further chosen, so that the distribution of the display beams DB in the optical waveguide element 110 may be more uniform by means of different refractive indices. Specifically, in the case that the refractive indices of the first light guide layer LG1, the second light guide layer LG2, the third light guide layer LG3 and the light exit portion 114 are equal, the display beam DB will not deflect when passing through the first interface IF1 or the second interface IF2 (refer to the display beam DB' drawn with a dotted line in FIG. 1). However, if the refractive indices of the first light guide layer LG1, the second light guide layer LG2 and the light exit portion 114 are equal and the refractive indices of the first light guide layer LG1, the second light guide layer LG2 and the light exit portion 114 are respectively less than or equal to the refractive index of the third light guide layer LG3, since the refractive angle is less than the incident angle when the beam enters an optically denser medium (a film layer with high refractive index) from an optically thinner medium (a film layer with low refractive index), the distance of transmitting the display beam DB in the third light guide layer LG3 will be shortened, that is, the distance between the display beam DB entering the third light guide layer LG3 and the display beam DB exiting the third light guide layer LG3 is shortened (the distance D may be shortened to the distance D'), thereby facilitating increase of the frequency of the display beam DB passing through the first interface IF1 or the second interface IF2, that is, the number of light splitting times is increased, so that the distribution of the display beams DB in the light entrance portion 112 is more uniform.

In the embodiment, a reflecting layer (not shown) or a light-absorbing layer (not shown) may be formed on at least one of the first sidewall surface SS1 and the second sidewall surface SS2 of the third light guide layer LG3. Alternatively, at least one of the first sidewall surface SS1 and the second sidewall surface SS2 may be a matte surface in order to prevent the display beam DB from leaking out.

In addition, by keeping the beam splitter BS closest to the second inclined surface T2 from the second inclined surface T2 by an appropriate distance, the display beam DB reflected by the beam splitter BS closest to the second inclined surface T2 may be prevented from interfering with the display beam DB passing through the second inclined surface T2. Specifically, the bottom surface SB2 of the light exit portion 114 is connected to the second inclined surface T2 and the bottom surface SB1 of the first light guide layer LG1, and the distance DT between a joint X of the bottom surface SB2 of the light exit portion 114 and the second inclined surface T2 and an orthographic projection point OP formed by the beam splitter BS closest to the second inclined surface T2 being projected onto the bottom surface SB2 of the light exit portion 114 is greater than or equal to 0 (i.e. the distance DT between the joint X and the orthographic projection point OP is greater than or equal to 0, wherein the joint X is between the bottom surface SB2 of the light exit portion 114 and the second inclined surface T2, and the orthographic projection point OP is formed by the beam splitter BS closest to the second inclined surface T2 being projected onto the bottom surface SB2 of the light exit portion 114). In other words, the beam splitter BS closest to the second inclined surface T2 is not superposed with the second inclined surface T2.

Figure 2:
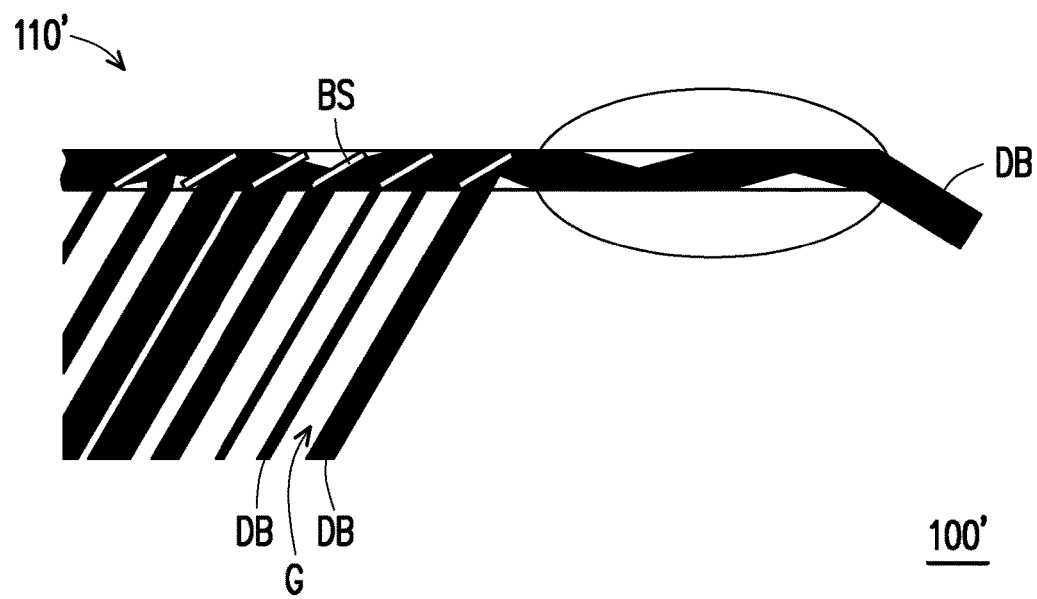
FIG. 2 shows a schematic view of the light path of an optical waveguide element transmitting an image beam in a display device of a comparative example.
Figure 3:
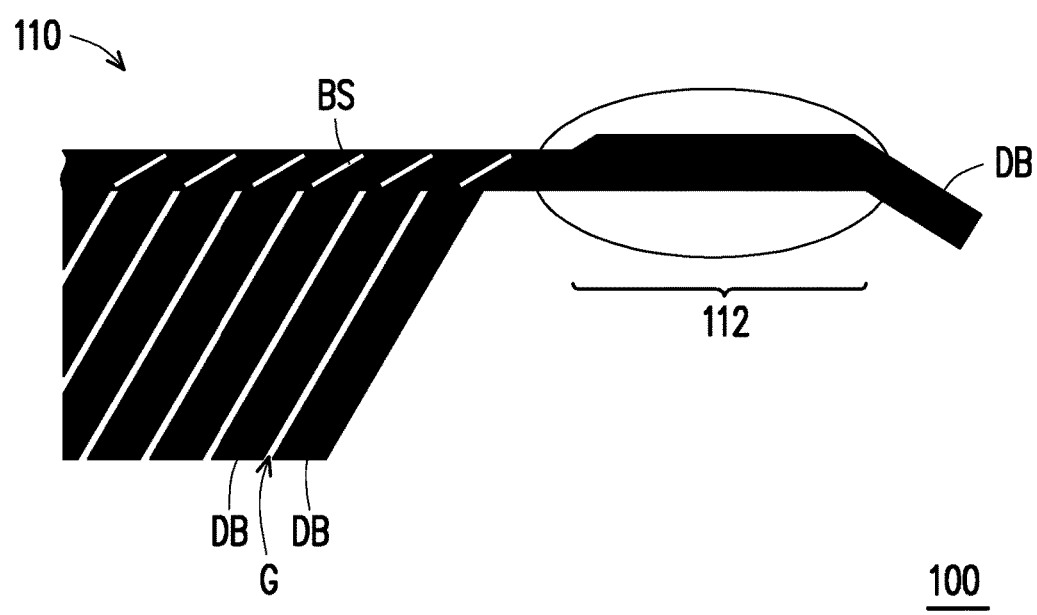
FIG. 3 shows a schematic view of the light path of an optical waveguide element transmitting an image beam in the embodiment of FIG. 1.

FIG. 2 shows a schematic view of the light path of an optical waveguide element transmitting an image beam in a display device of a comparative example, wherein the optical waveguide element of the comparative example is a single light guide plate, which does not adopt the multi-layered design. FIG. 3 shows a schematic view of the light path of the optical waveguide element transmitting an image beam in the embodiment of FIG. 1. In the display device 100' of FIG. 2, display beams DB cannot fill the optical waveguide element 110', as a result, the display beams DB which leave the optical waveguide element 110' are not distributed uniformly in the space, and gaps G among the display beams DB are large, forming obvious dark areas. Compared with the display device 100' of FIG. 2, the display device 100 of the embodiment of the invention may uniformly distribute the display beams DB in the light entrance portion 112 by utilizing the multi-layered design of the light entrance portion 112 (refer to the framed part), consequently, the distribution of the display beams DB exiting the optical waveguide element 110 is more uniform in the space, the gaps G among the display beams DB are small, and dark areas are eliminated.

Figure 4:
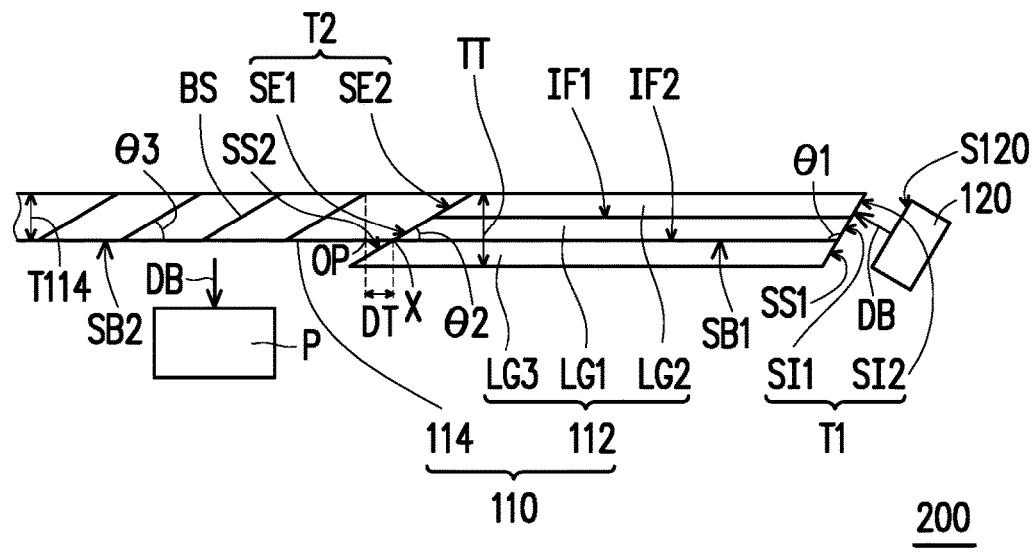
FIG. 4 and FIG. 5 are partial schematic cross-sectional views of the display device according to a second embodiment and a third embodiment of the invention.
Figure 5:
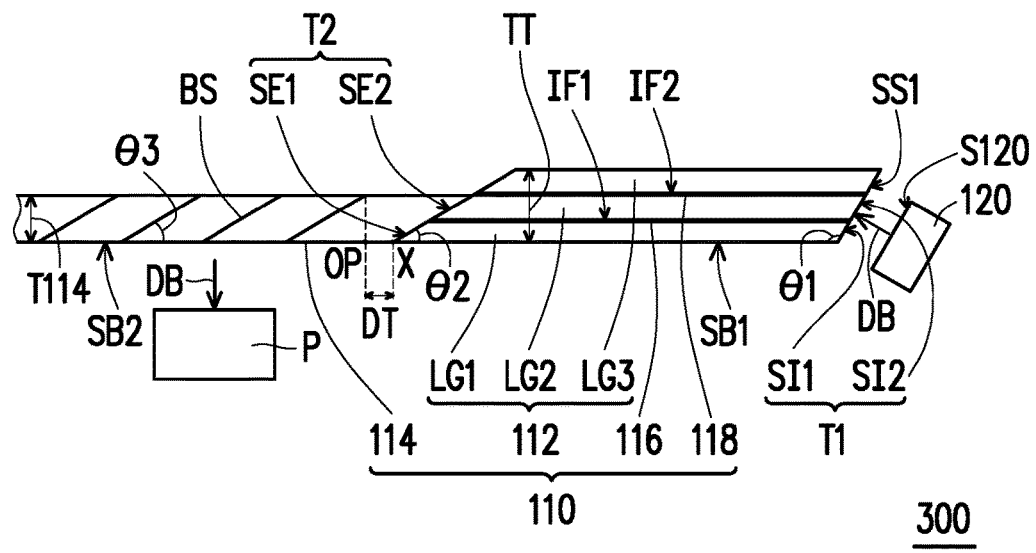

The display devices of the other embodiments of the invention are described in reference to FIG. 4 and FIG. 5, wherein the like or similar elements are represented by like or similar numbers, and the like or similar elements have the same or similar effects, and therefore are not repeated again below. FIG. 4 and FIG. 5 are partial schematic cross-sectional views of the display device according to a second embodiment and a third embodiment of the invention.

Please refer to FIG. 4, the main difference between a display device 200 and the display device 100 of FIG. 1 is described below. In the display device 200, the third light guide layer LG3 is connected to the first light guide layer LG1, so that the first light guide layer LG1 is located between the third light guide layer LG3 and the second light guide layer LG2.

Please refer to FIG. 5, the main difference between a display device 300 and the display device 100 of FIG. 1 is described below. In the display device 300, the optical waveguide element 110 further includes a first partial transmitting and partial reflecting layer 116 arranged at the first interface IF1 and a second partial transmitting and partial reflecting layer 118 arranged at the second interface IF2. The light transmittances of the first partial transmitting and partial reflecting layer 116 and the second partial transmitting and partial reflecting layer 118 may be different. For example, the light transmittance of the second partial transmitting and partial reflecting layer 118 may be so designed as to transmit 50 percent of the beams and reflect 50 percent of the beams, while the first partial transmitting and partial reflecting layer 116 may be so designed as to transmit the beams with incident angles less than 50 degrees and reflect the beams with incident angles greater than 50 degrees, but the invention is not limited thereto.

To sum up, the embodiments of the invention have at least one of the following advantages or effects. In the optical waveguide element of the embodiment of the invention, since the display beam is split continuously while passing through the first light guide layer, the second light guide layer and the third light guide layer, the sectional area of the display beam is enlarged, and therefore the optical waveguide element may improve the known phenomenon of nonuniform brightness which is caused when a display beam cannot effectively fill the sectional area of beam splitters in an optical waveguide element, so that the display beams which leave the optical waveguide element may be distributed uniformly in the space. In addition, the display device applying the above-mentioned optical waveguide element may have good display quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical waveguide element, adapted to receive a display beam, and the optical waveguide element comprising:
    a light entrance portion, comprising a first light guide layer, a second light guide layer, and at least one third light guide layer, wherein the second light guide layer is connected to the first light guide layer, the at least one third light guide layer is connected to the first light guide layer or the second light guide layer, wherein light entrance surfaces of the first light guide layer and the second light guide layer jointly compose a first inclined surface, light exit surfaces of the first light guide layer and the second light guide layer jointly compose a second inclined surface, the first inclined surface and the second inclined surface are respectively connected to and inclined relative to a bottom surface of the first light guide layer, and a reflecting layer or a light-absorbing layer is formed on at least one of a first sidewall surface and a second sidewall surface of the at least one third light guide layer; and
    a light exit portion, connected to the second inclined surface, wherein a thickness of the light exit portion is less than a total thickness of the first light guide layer, the second light guide layer, and the at least one third light guide layer,
    wherein refractive indices of the first light guide layer, the second light guide layer, and the light exit portion are equal, and the refractive indices of the first light guide layer, the second light guide layer, and the light exit portion are respectively less than or equal to a refractive index of the at least one third light guide layer,
    wherein the display beam enters the optical waveguide element through the first inclined surface of the light entrance portion, and is transmitted to a display area via the light exit portion.

2. The optical waveguide element according to claim 1, wherein the light exit portion has a plurality of beam splitters located therein, the beam splitters are parallel to each other and are arranged at intervals.

3. The optical waveguide element according to claim 1, wherein the first light guide layer is located between the second light guide layer and the at least one third light guide layer.

4. The optical waveguide element according to claim 1, wherein a first interface is between the first light guide layer and the second light guide layer, a second interface is between the at least one third light guide layer and the first light guide layer or the second light guide layer connected thereto, the first interface is parallel to the second interface, and the optical waveguide element further comprises:
    a first partial transmitting and partial reflecting layer, disposed at the first interface; and
    a second partial transmitting and partial reflecting layer, disposed at the second interface.

5. The optical waveguide element according to claim 4, wherein light transmittances of the first partial transmitting and partial reflecting layer and the second partial transmitting and partial reflecting layer are different.

6. The optical waveguide element according to claim 1, wherein the light exit portion has a plurality of beam splitters located therein, the beam splitters are parallel to each other and are arranged at intervals, a bottom surface of the light exit portion is connected to the second inclined surface and the bottom surface of the first light guide layer, and a distance between a joint of the bottom surface of the light exit portion and the second inclined surface and an orthographic projection formed by the beam splitter closest to the second inclined surface being projected onto the bottom surface of the light exit portion is greater than or equal to 0.

7. The optical waveguide element according to claim 1, wherein a first sidewall surface of the at least one third light guide layer and the first inclined surface are coplanar.

8. The optical waveguide element according to claim 1, wherein a second sidewall surface of the at least one third light guide layer and the second inclined surface are coplanar.

9. The optical waveguide element according to claim 1, wherein at least one of the first sidewall surface and the second sidewall surface of the at least one third light guide layer is a matte surface.

10. A display device, comprising:
    the optical waveguide element according to claim 1; and
    a display light source, disposed beside the first inclined surface, wherein the display light source is adapted to emit the display beam.

* * * * *